June 30, 1970  J. D. GADD  3,517,428
BRAZED ARTICLE WITH ALUMINIDE COATING STOP-OFF
Filed April 25, 1969
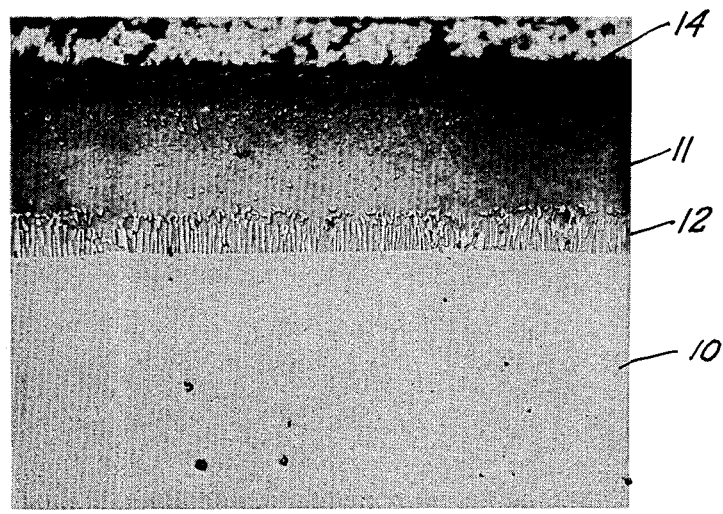
Inventor
John D. Gadd
by Hill, Sherman, Meroni, Gross & Simpson Attys.

United States Patent Office 3,517,428
Patented June 30, 1970

3,517,428
BRAZED ARTICLE WITH ALUMINIDE
COATING STOP-OFF
John D. Gadd, Willowick, Ohio, assignor to TRW Inc.,
Cleveland, Ohio, a corporation of Ohio
Continuation-in-part of application Ser. No. 548,423,
May 9, 1966. This application Apr. 25, 1969, Ser.
No. 819,314
Int. Cl. B32b *15/04*
U.S. Cl. 29—195                                    8 Claims

ABSTRACT OF THE DISCLOSURE

A brazed article comprising a pair of metallic members bonded together with a brazing alloy, at least one of the members being composed of an alloy having a base metal of the iron group and having a stop-off composition adjacent the area of brazing comprising an aluminide layer of the iron group metal having a superficial oxide layer thereover.

CROSS REFERENCE TO RELATED APPLICATION

This application is a continuation-in-part of my copending application entitled "Aluminide Coating Braze Stop-Off," Ser. No. 548,423, filed May 9, 1966, now Pat. No. 3,478,413, dated Nov. 18, 1969.

BACKGROUND OF THE INVENTION

Field of the invention

This invention is in the field of brazed articles wherein two metals, one of which is an alloy of a metal of the iron group, are joined by brazing, utilizing as a stop-off composition, an aluminide of the iron base metal having a superficial oxide coating.

Description of the prior art

In the brazing of alloys of the iron group (iron, cobalt, or nickel) it is common practice to provide a stop-off consisting of an oxide of chromium or aluminum in the areas in which the brazing alloy is not desired. These oxides are frequently fired onto the stop-off area, or they may be flame sprayed in that area. In either case, the oxide layers are quite porous and are only mechanically bonded to the substrate material. Consequently, they tend to spall off or are undercut by the brazing alloy during the brazing cycle.

SUMMARY OF THE INVENTION

The present invention provides an improved stop-off composition for brazing alloys having a base metal of the iron group, the stop-off effectively resisting the flow of brazing alloy during the brazing operation. The stop-off composition is one which is metallurgically bonded to the underlying metal and includes a dense intermediate non-porous layer consisting of an aluminide of the base metal and a superficial oxide coating on the aluminide.

BRIEF DESCRIPTION OF THE DRAWINGS

The drawing consists of a photographic reproduction of the surface of a nickel base alloy to which the improved stop-off composition of the present invention has been applied, the photograph being taken at a magnification of 500 times.

DESCRIPTION OF THE PREFERRED EMBODIMENTS

In accordance with the method of the present invention, the stop-off composition is provided by applying a suspension of aluminum particles over the area concerned, followed by heat treating the particles in a non-oxidizing atmosphere to cause diffusion of aluminum into the article and the production of a metal aluminide layer. This is followed by superficially oxidizing the aluminide layer to provide an exterior surface of an oxide thereon metallurgically bonded to the area by the intermediate aluminide layer. The oxidized layer and the aluminide layers can be left on or removed after brazing by mechanical abrading means such as sanding or blasting or by machining.

Metals of the iron group, namely, iron, nickel and cobalt, are capable of forming intermetallic compounds with aluminum, such compounds consisting to a large extent of the intermetallic MAl, where M is the iron group metal, and they also contain the compound $M_3Al$. The aluminide layer thus produced is dense and imperforate, providing an ideal substrate for the superficial oxide layer at the surface.

The invention is particularly applicable to the brazing of heat resistant alloys of iron, nickel and cobalt including the so-called "superalloys." While the chemistry of these alloys may vary widely and still be useful for the purposes of the present invention, the following table lists nickel, cobalt, and iron based alloys which can be provided with the improved stop-off of the present invention—

AISI 321 stainless:
    0.08 (max.) C
    2.0 (max.) Mn
    1.0 (max.) Si
    18 Cr
    10 Ni
    5×C (min.) Ti
    Bal. Fe
AISI 310 stainless:
    0.25 (max.) C
    2.0 (max.) Mn
    1.5 (max.) Si
    25 Cr
    20 Ni
    Bal. Fe
"Nimonic 90":
    0.1 (max.) C
    1.0 (max.) Mn
    1.0 (max.) Si
    20 Cr
    18 Co
    2.5 Ti
    1.5 Al
    5.0 (max.) Fe
    Bal. Ni
"Udimet 500":
    0.1 C
    19 Cr
    19 Co
    4 Mo
    3 Ti
    2.9 Al
    4 (max.) Fe
    Bal. Ni
"Udimet 700":
    0.1 C
    15 Cr
    19 Co
    5 Mo
    3.5 Ti
    4.5 Al
    4 (max.) Fe
    0.3 B "Hastelloy X":
    0.15 C
    22 Cr
    9 Mo
    20 Fe
    Bal. Ni
"Inconel 700":
    0.13 C
    0.08 Mn
    0.25 Si
    15 Cr
    30 Co
    3 Mo
    2.2 Ti
    3.2 Al
    1 Fe
    Bal. Ni
"Waspaloy":
    0.1 C
    19 Cr
    14 Co
    4 Mo
    3 Ti
    1.3 Al
    1 Fe
    Bal. Ni
    15 W
    2 Fe
    Bal. Co
"S-816":
    0.40 C
    1.2 Mn
    0.4 Si
    20 Cr
    20 Ni
    4 Mo
    4 W
    4 Cb
    4 Fe
    Bal. Co
"V-36":
    0.25 C
    1.0 Mn
    0.4 Si "Udimet 700":
Bal. Ni
"L-605":
0.15 C
1.5 Mn
0.5 Si
20 Cr
10 Ni
25 Cr
20 Ni
4 Mo
2 W
2 Cb
3 Fe
Bal. Co The aluminum particles, preferably of a size of about −325 mesh, are applied as a dispersion to the surface where the stop-off is to appear. Typically, the aluminum particles can be sprayed on utilizing a binder such as a nitrocellulose lacquer or polyisobutylene. Alternatively, the article to be brazed can be coated with the aluminum particle dispersion by dipping or by painting. Only the areas in which the stop-off is to be formed are given the coating of aluminum, the others being masked.

Next, the coated article is heat treated under non-oxidizing conditions for a time sufficient to cause the production of an aluminide on the surface. The heat treatment is preferably carried out either in a vacuum of less than 1 micron or in the presence of a non-oxidizing gas such as hydrogen, argon, helium, neon, and the like. Temperatures ranging from just above 1220° F. up to just under the melting point of the alloy are appropriate for this stage, the time of treatment of course varying with the temperature. At the preferred temperature range of 1800 to 2000° F., treatment times may extend from ½ to 1 hour.

The amount of diffusion of aluminum into the underlying substrate varies both with the composition of the base metal and the time of treatment. Aluminum, for example, diffuses more rapidly in chromium stainless steel than in materials containing nickel or cobalt. Normally, however, the treatment will be continued until an intermetallic aluminide layer measuring from about ½ to 3 mils in thickness is produced at the surface of the alloy.

Following the heat treatment, the aluminide coating is superficially oxidized in an oxidizing atmosphere, typically at a temperature of 1200° F. for a period of 1 hour. The oxide surface film which results provides a stop-off to the molten braze alloy, and the underlying aluminide layer provides a secure metallurgical bond between the base metal and the superficial oxide coating. The density and continuity of the oxide film produced in this manner provides a considerably more effective stop-off than the commercially used oxide stop-off materials.

In the photograph accompanying this disclosure, there is shown a nickel alloy substrate 10 having an aluminide layer 11 metallurgically bonded thereto along an interface 12, the aluminide leyer 11 containing the intermetallic compounds NiAl and Ni₃Al. An aluminum oxide layer 14 provides the advantages of an aluminum oxide coating without the disadvantage associated with the porosity of such coatings.

The following specific example illustrates the manner in which the stop-off layer of the present invention can be produced.

EXAMPLE

An aluminum-lacquer slurry was made up containing 100 grams of pure aluminum powder (−325 mesh) and 315 cc. of nitrocellulose lacquer. A 3 to 5 mil thickness slurry bisque was spray deposited on the surface to be coated, while the slurry was excluded from all other areas by masking. The green bisque was heat treated in a vacuum for ½ hour at 1800° F., to produce a nickel aluminide coating of 1 to 2 mils in thickness over the nickel superalloy base. The aluminide coating was then oxidized for 1 hour at 1200° F. to provide an oxide surface film composed substantially of aluminum oxide. This stop-off was found to be completely effective in restricting the flow of a nickel-gold-palladium braze alloy during the brazing of the nickel base superalloy.

It should be evident that various modifications can be made to the described embodiments without departing from the scope of the present invention.

I claim as my invention:

1. A brazed article comprising a pair of members bonded together with a brazing alloy, at least one of said members being composed of an alloy having a base metal of the iron group and having a stop-off composition adjacent the area of brazing comprising an aluminide layer of the iron group metal having a superficial oxide coating thereover.

2. The brazed article of claim 1 in which said base metal is nickel.

3. The brazed article of claim 1 in which said base metal is cobalt.

4. The brazed article of claim 1 in which said base metal is iron.

5. The brazed article of claim 1 in which said aluminide layer contains the intermetallic compound MAl where M is said iron group metal.

6. The brazed article of claim 1 wherein said aluminide is metallurgically bonded to the underlying substrate.

7. A brazed article comprising two members brazed together by means of a brazed junction, one of said members having a substrate of a nickel base alloy, the area adjacent said brazed junction having a stop-off coating including a nickel aluminide layer metallurgically bonded to said substrate, said layer having a superficial layer of aluminum oxide thereover.

8. The brazed article of claim 7 in which said nickel aluminide layer has a thickness of from about ½ to 3 mils.

References Cited

UNITED STATES PATENTS

| | | | |
|---|---|---|---|
| 1,637,033 | 7/1927 | Basch | 29—195 X |
| 1,877,569 | 9/1932 | Falkenthal | 175—356 |
| 3,000,755 | 9/1961 | Hanink et al. | 117—51 |
| 3,058,206 | 10/1962 | Mets | 29—196.2 |

L. DEWAYNE RUTLEDGE, Primary Examiner

E. L. WEISE, Assistant Examiner

U.S. Cl. X.R.

29—196.2

UNITED STATES PATENT OFFICE
CERTIFICATE OF CORRECTION

Patent No. 3,517,428                Dated June 30, 1970

Inventor(s) John D. Gadd

It is certified that error appears in the above-identified patent and that said Letters Patent are hereby corrected as shown below:

Column 2, lines 54 to 56 (right hand side) delete:

15 W
     2 Fe
    Bal. Co

Column 3, after line 8 (left hand side) insert

15 W
     2 Fe
    Bal. Co

Signed and sealed this 1st day of December 1970.

(SEAL)
Attest:

EDWARD M. FLETCHER, JR.            WILLIAM E. SCHUYLER, JR.
Attesting Officer                     Commissioner of Patents

UNITED STATES PATENT OFFICE
CERTIFICATE OF CORRECTION

Patent No. 3,517,428          Dated June 30, 1970

Inventor(s) John D. Gadd

It is certified that error appears in the above-identified patent and that said Letters Patent are hereby corrected as shown below:

Column 2, lines 54 to 56 (right hand side) delete:

15  W
     2  Fe
    Bal. Co

Column 3, after line 8 (left hand side) insert

15  W
     2  Fe
    Bal. Co

Signed and sealed this 1st day of December 1970.

(SEAL)
Attest:

EDWARD M. FLETCHER, JR.          WILLIAM E. SCHUYLER, JR.
Attesting Officer                Commissioner of Patents